United States Patent [19]

Forschner

[11] 3,841,818

[45] Oct. 15, 1974

[54] EXTRUDER WITH FEED SYSTEM

[75] Inventor: Andrew C. Forschner, Middlefield, Ohio

[73] Assignee: The Johnson Rubber Company, Middlefield, Ohio

[22] Filed: Jan. 24, 1973

[21] Appl. No.: 326,183

[52] U.S. Cl............... 425/376, 425/145, 425/447
[51] Int. Cl............................................. B29f 3/02
[58] Field of Search ............ 425/145, 322, 376, 447

[56] References Cited
UNITED STATES PATENTS

| | | | |
|---|---|---|---|
| 3,712,773 | 1/1973 | Baumgarten | 425/142 |
| 3,728,056 | 4/1973 | Theysohn | 425/145 X |

FOREIGN PATENTS OR APPLICATIONS

| | | | |
|---|---|---|---|
| 4,514,874 | 5/1970 | Japan | 425/322 |

*Primary Examiner*—R. Spencer Annear
*Attorney, Agent, or Firm*—McNenny, Farrington, Pearne & Gordon

[57] ABSTRACT

An extruder feed system is disclosed having a conveyor for smoothly transporting and guiding a supply of elastomeric material in ribbon form or the like from a source to an extruding machine while providing control over the rate of flow of the material.

8 Claims, 2 Drawing Figures

PATENTED OCT 15 1974  3,841,818

EXTRUDER WITH FEED SYSTEM

BACKGROUND OF THE INVENTION

This invention relates generally to the extrusion of uncured elastomeric materials or the like, and more particularly to a novel and improved conveyor system for feeding uncured ribbon stock to a cold tuber or extruder.

PRIOR ART

Generally in the past, it has been the practice to supply uncured elastomeric stock to a cold extruder, usually referred to as a "cold tuber" as an uncured ribbon. Such stock is usually supplied from a wire basket or similar container in which the ribbon is folded back and forth in horizontal reaches. The extension stock medium may take this form as the output of a processing machine, known in the industry as a "bamburry."

Since the cold tuber does not need the heat energy stored in the extrusion medium by the bamburry for extrusion processing, it is not imperative that the uncured elastomeric stock be transported immediately to the extruder, and it may be stored in the transporting containers for a substantial period of time until the supply is necessary. However, when the uncured elastomeric stock has been stored in its folded condition for a period of time, there is a tendency for the adjacent layers or reaches to stick together. When the adjacent reaches or layers tend to stick together, difficulty can result when the ribbon is removed from the containers, since the ribbon often fails to leave the container in a single layer ribbon.

If the uncured elastomeric stock is fed into the extruder in a folded condition, it can jam in the machine inlet and prevent uniform extrusion. Since quality extrusion requires a continuous or uniform movement of the material through the extrusion die, such clogging may often result in an unsatisfactory product.

Difficulties are also encountered if the ribbon drags across the edge of the supply container or the edge of the feed opening of the extruder, since engagement with such edges tends to cause the ribbon material to bunch up and inhibit uniform movement of the stock into the feed screw of the extruder. In other instances, the engagement with the edge of the feed opening can cause breaking of the ribbon. Further, the even material flow by manual feeding is sometimes inhibited by the existence of the non-uniformity in the cross section of the elastomeric stock. The uncured elastomeric stock, although substantially in ribbon form, is not always uniform in cross section, and may be thicker in some places than in others. These lumps or thick sections can clog the machine if the operator is not careful to apply some tension force against the pull of the screw to thin the uneven ribbon to approximate uniformity.

Finally, there is always the problem of safety when an operator must be close to any machinery which may cause his injury if he is careless. Working near the moving screw of the extruder tube while manually feeding the elastomeric stock into the machine or clearing a blockage creates a potential hazard to the operator.

SUMMARY OF THE INVENTION

With the present invention, feeding of the stock to the tuber or extruder is uniformly maintained and improved extrusion product is obtained. A system is provided with a conveyor arranged to lift the stock substantially vertically from the supply container to minimize the tendency of the stock reaches to stick together. The conveyor also operates to guide the ribbon of stock so that it does not engage the edges of the feed opening of the extruder thereby eliminating the tendency of the ribbon to bunch up or tear. Further, operator controlled means are provided to controllably resist the movement of the ribbon to the feed opening permitting the operator to stretch selected portions of stock to eliminate thickened sections in the ribbon supply.

In the illustrated embodiment, a conveyor frame is pivotally supported on the tuber adjacent to the feed opening and is movable from an operative position to an inoperative position clear of the tuber. The frame is inclined upwardly from the position adjacent to the feed opening of the tuber to an upper end preferably located substantially vertically above the container of stock. First guide rolls are located at the upper end of the frame to guide the stock upwardly in a generally vertical direction from the container to the conveyor. From the first guide rolls, the stock ribbon passes through a power-operated control utilized by the operator to controllably resist stock movement and subsequently over an exit guide roll which directs the stock ribbon cleanly into the feed opening of the tuber.

With the illustrated embodiment of this invention, the ribbon of stock is pulled into the tuber by the tuber feed screw in a manner which minimizes the tendency of reaches to stick together as they are pulled out of the stock container and the ribbon is supplied to the tuber in a uniform manner so that a uniform high quality extrusion is produced.

DETAILED DESCRIPTION OF THE DRAWINGS

Figure 1:
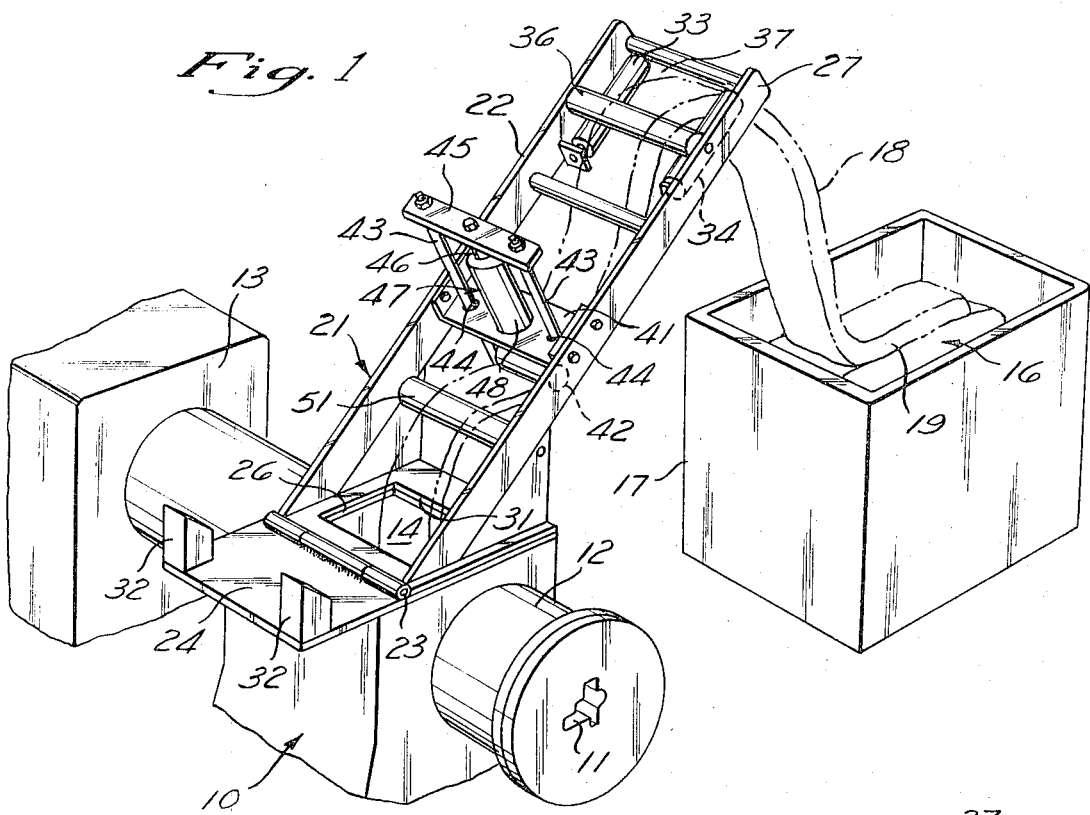
FIG. 1 is a perspective view of a preferred embodiment of this invention illustrating the manner in which the ribbon stock moves from the supply container to the tuber feed opening.

Referring to the drawings, the illustrated embodiment of this invention includes a conventional tuber 10 having an extrusion orifice 11 mounted on one end of a barrel 12 through which elastomeric material is extruded to the desired shape. A screw (not illustrated) is mounted within the barrel 12 and is powered by a motor 13 to feed the elastomeric material from a feed opening 14 to the orifice 11. The supply of elastomeric material 16 is located in a container 17 which may be of any suitable type such as a wire basket or open-topped box positioned adjacent to the tuber 10. The supply of elastomeric material is in the form of a ribbon 18 which is folded back and forth in horizontally extending reaches 19 within the container 17. In normal practice, the ribbon is fed into the container 17 from a bamburry or the like and is stored in the container until its use is required. Consequently, the reaches 19, because the material is uncured, tend to adhere or stick together after a period of storage.

In order to feed the ribbon of elastomeric stock 18 from the container 17 to the feed opening 14 of the tuber 10, a conveyor 21 is provided. The conveyor includes a generally rectangular frame 22 which is pivotally mounted at 23 on a support plate 24. The support plate is mounted on the tuber 10 and is provided with an opening 26 which registers with the feed opening 14.

Figure 2:
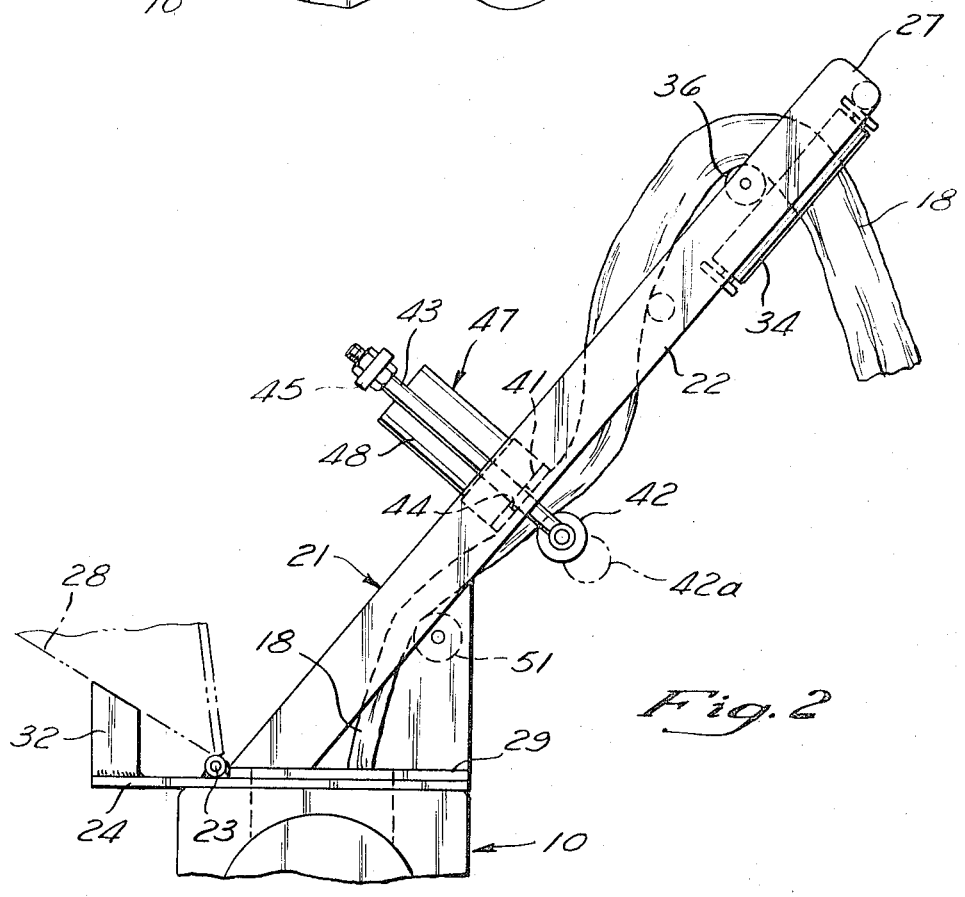
FIG. 2 is a side elevation of the conveyor illustrated in FIG. 1.

When the conveyor 21 is in the operative position illustrated in FIG. 1 and in full line in FIG. 2, the frame 22 extends in an inclined direction from the pivot 23 adjacent to the opening 14 to an upper and laterally positioned end at 27. The frame 22 may be pivoted about the pivot 23 to the phantom line position at 28 illustrated in FIG. 2. In such position, the conveyor is clear of the feed opening to allow easy servicing of the tuber 10. In the operative position, a base plate 29 which is part of the frame 22 engages the support plate 24. Here again, the base plate is formed with an opening 31 which registers with the opening 26 and the feed opening of the tuber. In the retracted or service position, stop blocks 32 mounted on the support plate 24 engage the frame and position the conveyor.

Mounted at the upper end 27 of the frame 22 are a pair of side rollers 33 and 34 which are journaled to rotate about their respective axes and cooperate with a laterally extending roller 36 to form a guide opening 37 located substantially vertically above the container 17. These rollers provide a low friction guide for the ribbon of elastomeric material 18 so that the reaches 19 are directed substantially vertically up from the container 17 to the conveyor as the ribbon is pulled into the machine by the feed screw of the tuber. Because the ribbon is guided upwardly substantially perpendicular to the reaches 19 within the container, each reach is pulled away from the adjacent lower reach, and the separating force between the reaches is concentrated and is strongest where one fold or reach becomes free from the adjacent reach. The effect of this separating force is to produce a line of stress concentration which causes one reach to progressively release from the adjacent lower reach without requiring excessive tension forces in the elastomeric ribbon. The feed opening 37 is also positioned with respect to the container so that the edge of the container is not engaged to any substantial degree.

From the feed opening 37, the ribbon passes between a plate 41 which extends laterally across the frame and a roller 42. The roller 42 is journaled at its ends on a pair of spaced draw rods 43 which extend through openings 44 in the plate 41 to a cross bar 45 on which they are mounted. The cross bar 45 is connected to the piston 46 of a piston and cylinder actuator 47. The cylinder 48 of the actuator 47 is mounted on the plate 41. The cylinder is connected to a suitable source of fluid under pressure which may be either pneumatic or hydraulic through a suitable control valve so that the operator may extend or retract the piston 46 to cause the roller 42 to move toward or away from the plate 41. Therefore, the operator can adjustably grip the ribbon between the roller 42 and plate 41 to vary the resistance to movement of the ribbon 18 along the conveyor for the purposes described in greater detail below.

Journaled on the frame 22 above the feed opening 14 is a laterally extending roller 51 over which the ribbon 18 passes and is guided into the feed opening 14 without engaging the edges thereof.

In operation, the machine operator first positions the conveyor in the operative position illustrated and positions the container of elastomeric ribbon stock 18 so that it is substantially below the feed opening 37. The free end of the stock 18 is then manually fed up through the opening 37 and then down along the conveyor between the plate 41 and the roller 42. While this initial feeding of the free end occurs, the operator preferably retracts the piston 46 so that the roller 42 is in the phantom line position 42a so that the stock is free to feed. The end of the stock is then passed over to the roller 51 and into the feed opening where it is engaged by the extruder feed screw. The tuber or extruder is then started and the feed screw thereof pulls the ribbon into the feed opening and extrudes the stock out of the orifice 11.

If the operator notices that a thick portion of ribbon exists at a particular location along the stock 18, the actuator 47 is operated to move the roller 42 toward the plate 41 to resist movement of the ribbon to the tuber a sufficient amount to prevent clogging of the feed opening 14. By proper operation of the actuator 47, the operator can insure that a uniform and proper supply of stock reaches the feed screw to insure that it functions uniformly to extrude the stock through the orifice. Consequently, a uniform, high quality extrusion is obtained, and the operator does not have to manually control the rate of feed. Further, since the conveyor guides the stock cleanly out of the container 17 and cleanly into the feed opening 14, the tendency of the stock to ball-up or clog is virtually eliminated. Still further, since the conveyor guides the stock in a generally vertical direction up out of the container 17, the tendency for the adjacent reaches to remain together is virtually eliminated.

Although a preferred embodiment of this invention is illustrated, it is to be understood that various modifications and rearrangement of parts may be resorted to without departing from the scope of the invention disclosed and claimed herein.

What is claimed is:

1. An extruder feed system comprising a source of uncured elastomeric stock in ribbon form in which said ribbon is folded back and forth in a stack of horizontally extending reaches, an extruder laterally spaced from said source having a feed opening and operable to pull said ribbon stock into said feed opening, and a conveyor providing first non-driven guide means positioned substantially above said source and operable to guide said ribbon from said source in a generally vertical direction and second non-driven guide means operable to position said ribbon from said first guide means for movement into said feed opening without sufficient contact with the sides thereof to appreciably impair movement of said ribbon, operation of said extruder pulling said ribbon from said source and through both of said guide means into said feed opening, said conveyor including adjustable means operable to resist movement of said ribbon stock into said feed opening with a force which is adjustable to adjustably determine the rate of removal of stock from said source.

2. An extruder feed system as set forth in claim 1 wherein said conveyor includes adjustable means operable to resist movement of said ribbon stock into said feed opening with a force which is adjustable.

3. An extruder feed system as set forth in claim 1 wherein said adjustable means includes a static frictional element and powered element operable to press said ribbon against said static element.

4. An extruder feed system as set forth in claim 3 wherein said powered element is connected to and powered by a piston and cylinder actuator.

5. An extruder feed system as set forth in claim 1 wherein said first guide means are positioned above said second guide means, said feed opening being laterally spaced from said source of uncured elastomeric stock.

6. An extruder feed system as set forth in claim 1 wherein said conveyor is pivotally mounted on said extruder for movement between an operative position to a service position in which free access to said feed opening is provided.

7. An extruder feed system as set forth in claim 1 wherein both first and second guide means include rollers substantially parallel to one another operable to form a generally predetermined path between said supply and said feed opening.

8. An extruder feed system as set forth in claim 7 wherein said adjustable means is positioned between said first and second guide means and cooperating with them to form said predetermined path.

* * * * *